United States Patent [19]
Fukakusa et al.

[11] Patent Number: 5,761,178
[45] Date of Patent: Jun. 2, 1998

[54] OPTICAL INTEGRATING ELEMENT AND INTEGRATION TYPE OPTICAL PICKUP DEVICE USING THE SAME

[75] Inventors: Masaharu Fukakusa, Saga; Taiichi Mori; Shogo Horinouchi, both of Fukuoka, all of Japan

[73] Assignee: Matsushita Electric Industrial Co., Ltd., Osaka, Japan

[21] Appl. No.: 843,943

[22] Filed: Apr. 17, 1997

Related U.S. Application Data

[62] Division of Ser. No. 601,783, Feb. 15, 1996, Pat. No. 5,687,155.

[30] Foreign Application Priority Data

Oct. 18, 1994 [JP] Japan ................. 6-251889

[51] Int. Cl.$^6$ ................. G11B 7/00
[52] U.S. Cl. ................. 369/112; 369/44.12
[58] Field of Search ................. 369/112, 100, 369/110, 111, 109, 121, 120, 44.11, 44.12, 44.14, 44.41

[56] References Cited

U.S. PATENT DOCUMENTS

| | | |
|---|---|---|
| 5,450,237 | 9/1995 | Yoshida et al. ............ 369/112 X |
| 5,566,157 | 10/1996 | Kojima et al. ............ 369/112 |
| 5,621,715 | 4/1997 | Ohyama ............ 369/112 |

*Primary Examiner*—Muhammed M. Edun
*Attorney, Agent, or Firm*—McDermott, Will & Emery

[57] ABSTRACT

An optical integration element of the invention comprises a substrate possessing a light emitting element for emitting light, and a receiving sensor for receiving reflected light, an incident part composed of an optical transparent material for receiving the light from the light emitting element, a first reflecting part for reflecting the light entering from the incident part, a second reflecting part for reflecting by converting the light from the first reflecting part into nearly parallel light or convergent light, a condensing part for condensing the light from the second reflecting part, and an optical member forming an optical path transforming part for guiding the reflected light into the receiving sensor.

8 Claims, 13 Drawing Sheets

OPTICAL INTEGRATING ELEMENT AND INTEGRATION TYPE OPTICAL PICKUP DEVICE USING THE SAME

This is a divisional of application Ser. No. 08/601,783, filed Feb. 15, 1996 now U.S. Pat. No. 5,687,155.

BACKGROUND OF THE INVENTION

The present invention relates to an apparatus for condensing laser light into a tiny spot on an optical recording medium and reproducing information optically, and more particularly to an optical integrating element suited to read-only compact disc (CD-ROM) or the like, and an integration type optical pickup device using the same.

In an optical pickup device used in reading of signal on a disk surface of read-only compact disc memory (CD-ROM) or the like, information is read out by condensing laser light emitted from a light emitting element such as semiconductor laser in a tiny spot on a disk surface by condenser lens or the like. The reflected light having an optical signal from the disk surface is guided into a photo sensor by prism or the like, and the optical signal is converted into an electric signal, so that the data may be reproduced. To read out the data stably, moreover, it comprises a focus function for keeping the tiny spot regardless of fluctuations such as disk run-out and eccentricity, and a tracking function for causing the spot to follow up the track data. The optical information reproducing apparatus incorporating such optical pickup device is demanded to be advanced in the tape transfer speed, and smaller in size and lower in power consumption to be incorporated in a portable type personal computer or the like.

Figure 12:
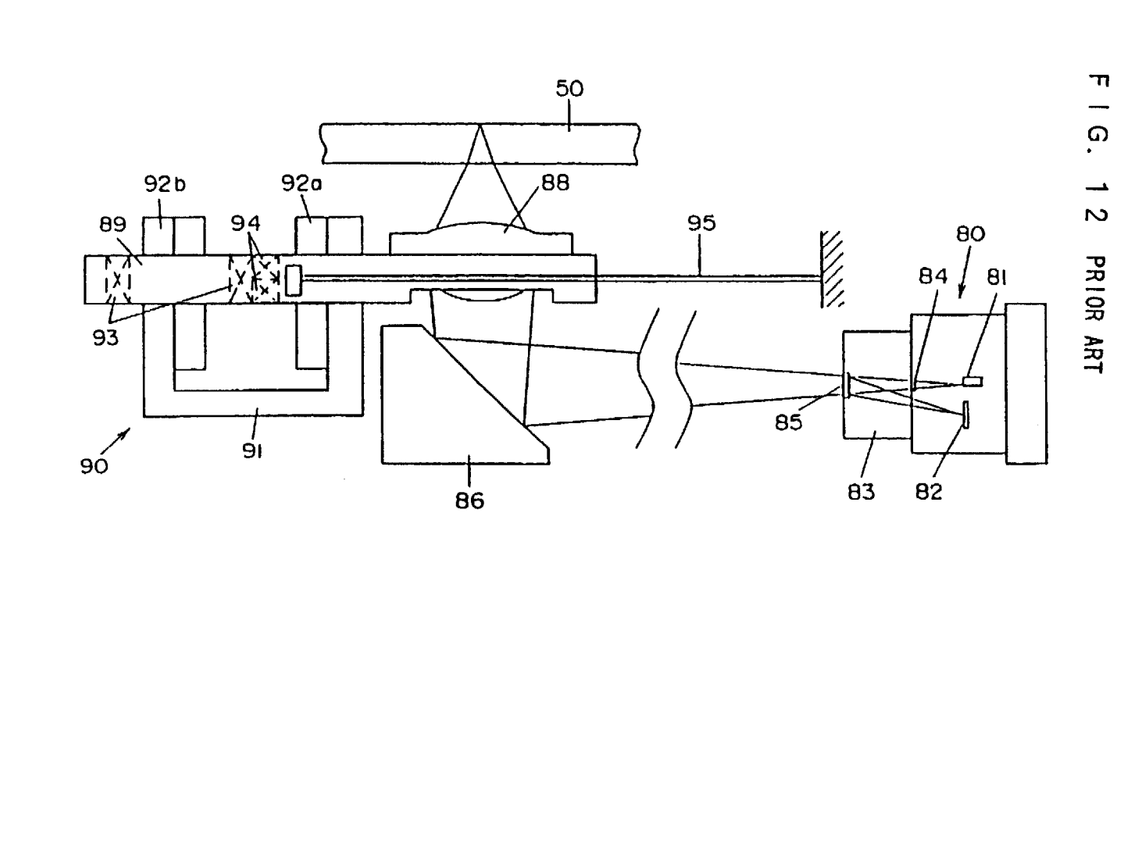
FIG. 12 is a side view showing a constitution of a conventional optical pickup device.

FIG. 12 is a side view showing the constitution of an optical pickup device in first prior art.

In the bottom of an optical disk 50, a laser unit 80, a riser mirror 86, and an objective lens 88 are disposed, and a semiconductor laser element 81 and a multi-division photo sensor 82 are installed in the laser unit 80. An optical member 83 is fixed at a light exit of the laser unit 80, and a diffraction grating 84 for generating three beams and a diffraction grating 85 for leading the reflected light from the optical disk 50 into the multi-division photo sensor 82 are formed in the optical member 83.

The operation of thus composed optical pickup device is described below. The laser light emitted from the semiconductor laser element 81 is diffracted into main beam (order 0 light) and sub beams for tracking (order +1 light, order −1 light) by the diffraction grating 84 for generating three beams. The diffracted lights pass through the optical member 83, and deflected by 90 degrees in the direction of optical disk 50 by the riser mirror 86, and condensed in the optical disk 50 by an objective lens 88. This is the explanation of the forward path.

In the returning path, on the other hand, the reflected light from the optical disk 50 nearly traces back the forward path and reaches the optical member 83. The light reaching the optical member 83 is diffracted and deflected by the diffraction grating 85, and is guided into the multi-division photo sensor 82. The guided light is photoelectrically converted by the multi-division photo sensor 82, and the converted electric signal is detected as data signal, focus error signal, and tracking error signal.

Generally, the optical pickup device requires the focus function for adjusting the focus by following up the run-out of the optical disk 50, and the tracking function for causing the spot to follow up the meandering of the data track caused by eccentricity of the optical disk 50 or the like. The focus function and tracking function are described below. In FIG. 12, a lens holder 89 for fixing the objective lens 88 is supported movably in two axial directions, that is, the focus drive direction and tracking drive direction by a support member 95. In a focus tracking actuator 90, a magnetic circuit is composed by focusing coil 93 and tracking coil 94 fixed on the lens holder 89, and magnets 92a, 92b fixed on a yoke 91. The focus tracking actuator 90 is driven by focus error signal and tracking error signal obtained from the multi-division photo sensor 82, thereby performing focus control and tracking control.

In the optical pickup device of the first prior art, however, the laser unit 80 is same in size as the ordinary laser package, and the thick optical member 83 is fixed to the exit part of the laser unit 80, and therefore this portion becomes large in size. Moreover, to put the exit light from the laser unit 80 into the objective lens 88, the riser mirror 86 is necessary, which posed a limit for reducing the size and thickness of the entire optical pickup.

To improve the optical pickup device of the first prior art, a new optical pickup device has been proposed.

Figure 13:
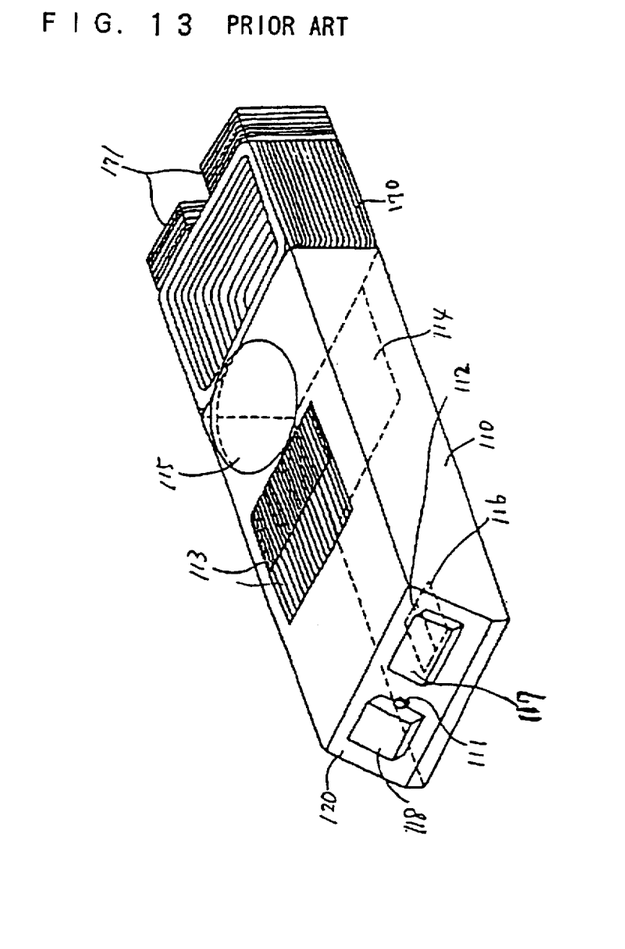
FIG. 13 is a perspective view showing an optical element used in other conventional optical pickup device.
Figure 14:
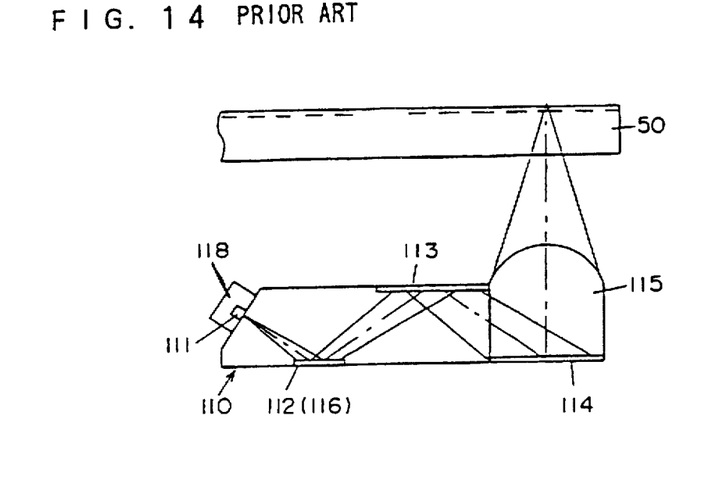
FIG. 14 is a side view showing an optical path of light in the optical element shown in FIG. 13.
Figure 15:
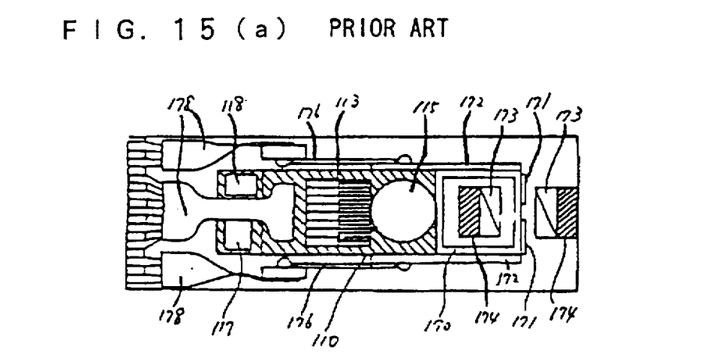

Referring now to FIG. 13, FIG. 14, FIG. 15 (a), and FIG. 15 (b), the optical pickup device of the second prior art is described below FIG. 13 is a perspective view showing an optical element used in the optical pickup device of the second prior art. In FIG. 13, on a transparent substrate 110 formed of an optical material, an aspherical objective lens 115, and a hologram collimator lens 114 provided on the opposite side of the aspherical objective lens 115 are formed. On the aspherical objective lens 115 forming side, two kinds of hologram beam splitters 113 are formed, and on the hologram collimator lens 114 forming side, a diffraction grating 112 for generating three beams and a mirror 116 are formed adjacently to each other. Moreover, at the opposite end of the position of forming the aspherical objective lens 115, a slope 120 is formed, and a semiconductor laser element 111 is formed on the slope 120 through a silicon substrate 118. On the slope 120 positioned in the width direction of the semiconductor laser element 111, a multi-division photo sensor 117 is fixed. A focusing coil 170 is fixed to the side surface of the transparent substrate 110, and a tracking coil 171 is fixed to the side surface of the focusing coil 170.

The operation of the optical device of the second prior art is described below by reference to FIG. 14.

FIG. 14 is a side view showing the optical device of the second prior art and an optical path of propagating light.

The laser light emitted from the semiconductor laser 111 toward the inside of the transparent substrate 110 is distributed into three diffraction lights of order 0 light, order +1 light and order −1 light by the diffraction grating 112 for generating three beams. These diffraction lights are reflected by the hologram beam splitter 113 and hologram collimating lens 114, and pass through the spherical objective lens 115 to be condensed in the optical disk 50 positioned above the transparent substrate 110.

The optical pickup device composed by using the optical device of the second prior art is described while referring to FIG. 15 (a) and FIG. 15 (b).

FIG. 15 (a) is a plan view of seeing the optical pickup device of the second prior art from the top. FIG. 15 (b) is a side view of the optical pickup device of the second prior art seen from the side. On the transparent substrate 110, the focusing coil 170 gluing the tracking coil 171 is fixed. The focusing coil 170 is reinforced by using a glass epoxy substrate 172, and is integrated with the transparent substrate 110. In the glass epoxy substrate 172, ends of four wires 176 are fixed to both sides of the transparent substrate 110 by two pieces each, and other ends of the wires 176 are fixed to a column 177 provided in a lower substrate 175. The focusing coil 170, tracking coil 171, and transparent substrate 110 are supported by the wires 176 movably in the focus direction and tracking direction. A permanent magnet 173 is disposed in the hollow part of the focusing coil 170 and the tracking coil 171 fixing side of the focusing coil 170, and the permanent magnet 173 is fixed to a yoke 174. The focus control current, tracking control current, semiconductor laser element drive current, focus error signal, and tracking error signal are exchanged by a flexible printed circuit (FPC) 178.

In the optical device of the second prior art, however, since a zigzag optical path is composed of three reflection planes of the diffraction grating for generating three beams, hologram beam splitter, and hologram collimator lens, it involves a defect that the optical substrate is longer in the length direction. Besides, it is weak against wavelength fluctuations before of the large angle formed by the direction of the light entering the hologram collimator lens and the direction of reflecting light, and therefore if the wavelength fluctuates due to semiconductor laser by changes in ambient temperature, chromatic aberration becomes too large. Accordingly, the jitter characteristic deteriorates, and an error may occur when reading out the data.

Still more, in the conventional optical pickup device, the semiconductor laser element fixed in the conventional optical device is exposed to atmosphere, and the semiconductor laser deteriorates due to steam and other corrosive gas existing in the air, which may lead to shortening of the life, or even the element may be broken in a worst case.

Further more, since the focusing coil and tracking coil are supported on the optical substrate, a glass epoxy substrate is fixed, and wires are fixed on the glass epoxy substrate. Accordingly, the number of parts increases, and the assembling performance is poor because of small size.

Yet, in the case of the integration type optical pickup device integrating the optical element, light emitting element and photo sensor as in the prior art, in order to obtain a favorable tracking error signal, it is necessary to move the entire optical pickup device, and assemble the condensed three beam spots into the specified position in the data track.

SUMMARY OF THE INVENTION

It is a first object of the invention to present an optical integration element suited to a small and thin integration type optical pickup device, strong in resistance to wavelength fluctuations of the light emitting element due to temperature changes or the like, and capable of being reduced in dimension in the length direction, thereby solving the problems in the prior arts.

It is a second object of the invention to present an integration type optical pickup device suited to an optical disk device, especially a red-only compact disc (CD-ROM) drive, being small in size and thickness, high in reliability, and easy to assemble.

To achieve the objects, the invention provides an optical integration element comprising a light emitting element for emitting light, receiving means for receiving reflected light, and optical member, wherein the optical member possesses a first plane confronting a medium, and a second plane on the opposite side of the first plane, and further comprises a first reflecting part for reflecting the light emitted from the light emitting element, a second reflecting part for reflecting the light from the first reflecting part by converting into nearly parallel light or convergent light, and a condensing part for condensing the light from the second reflecting part, the first reflecting part and condensing part are formed on the first plane, the second reflecting part is formed on the second plane, the first reflecting part and condensing part are arranged so as not to overlap each other, and the light emitting element confronts the second plane.

One aspect of an integration type optical pickup device of the invention comprises an optical integration element, focusing means for moving the optical integration element in the focus direction, and tracking means for moving the optical integration element in the tracking direction, wherein the optical integration element is composed of a light emitting element for emitting light, a photo sensor for receiving a reflected light, and an optical member, the optical member possesses a first plane confronting a medium, and a second plane on the opposite side of the first plane, and further comprises a first reflecting part for reflecting the light emitted from the light emitting element, a second reflecting part for reflecting the light from the first reflecting part by converting into nearly parallel light or convergent light, and a condensing part for condensing the light from the second reflecting part, the first reflecting part and condensing part are formed on the first plane, the second reflecting part is formed on the second plane, the first reflecting part and condensing part are arranged so as not to overlap each other, and the light emitting element confronts the second plane.

Other aspect of an integration type optical pickup device of the invention comprises light emitting means, an optical member for guiding the light emitted from the light emitting means and forming optical means integrally, a bobbin accommodating the optical member and having confronting first and second openings, a base unit, elastic means provided between the base and bobbin, and magnetic force generating means disposed at the bobbin and the position confronting the bobbin of the base, wherein the optical member is accommodated in the bobbin, the first opening is closed with the optical member, the second opening is closed with a lid member, and the light emitting means is provided between the lid member and optical member.

BRIEF DESCRIPTION OF THE DRAWINGS

FIG. 4 (a) is a side view showing an optical path of the light from optical disk to photo sensor in the optical integration element shown in FIG. 1.

FIG. 4 (b) is its front view.

FIG. 5 (a), FIG. 5 (b), and FIG. 5 (c) are plan views showing the configuration of photo sensor and receiving spot of the optical integration element shown in FIG. 1.

FIG. 8 (a) is a plan view showing the mode of assembling the members shown in FIG. 7.

FIG. 8 (b) is its side view.

FIG. 15 (a) is a plan view of the optical pickup device using the optical element shown in FIG. 13 as seen from the top, and FIG. 15 (b) is its side view.

DESCRIPTION OF THE PREFERRED EMBODIMENTS

An example of optical integration element of the invention is explained by reference to FIG. 1 and FIG. 2.

Figure 1:
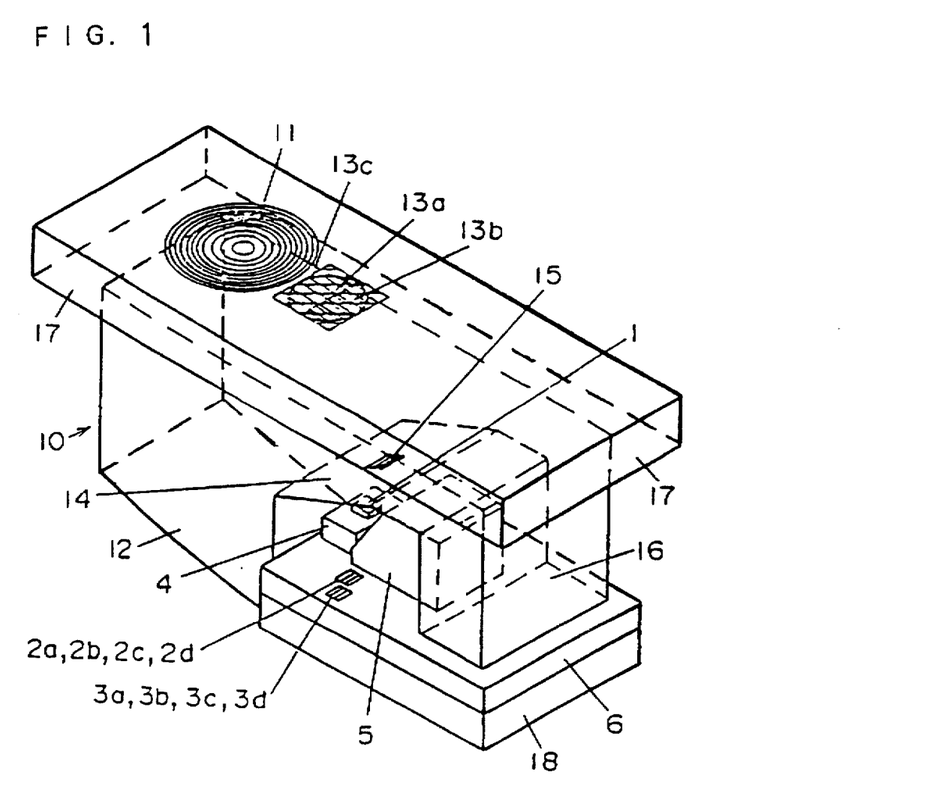
FIG. 1 is a perspective view showing an optical integration element in an embodiment of the invention.
Figure 2:
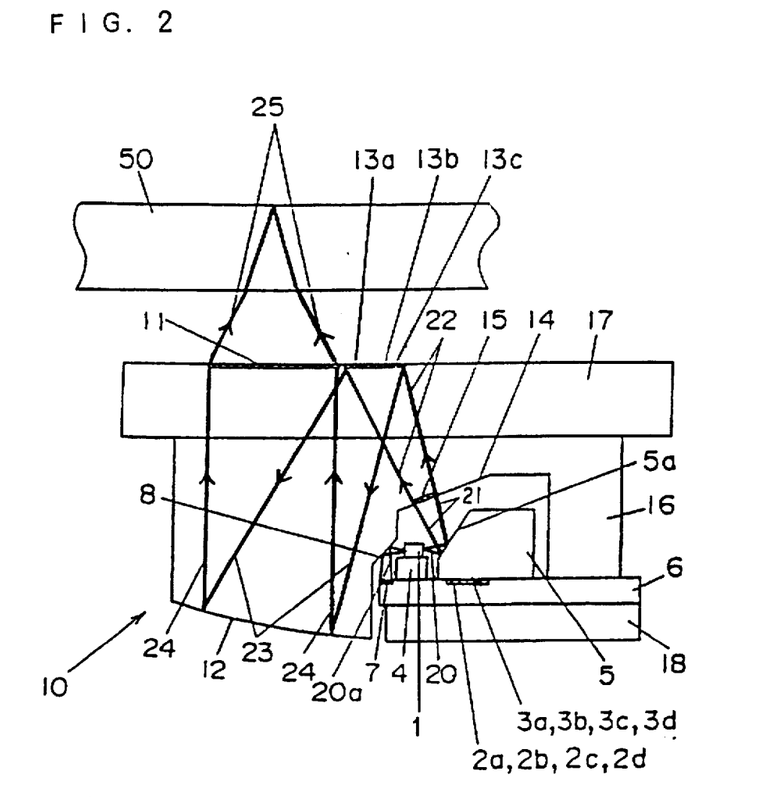
FIG. 2 is a side view showing an optical path of light from light emitting element to optical disk in the light integration element shown in FIG. 1.

In FIG. 1 and FIG. 2, photo sensors 2a, 2b, 2c, 2d, photo sensors 3a, 3b, 3c, 3d, and a monitor sensor 7 are formed on a silicon substrate 6 by semiconductor process or the like. A light emitting element 1 composed of semiconductor laser element is fixed on the silicon substrate 6 througha mount member 4 formed of a material of high thermal conductivity. A riser mirror 5 is fixed on the silicon substrate 6. A cooling plate 18 for promoting release of heat being fixed on the silicon substrate 6 is formed of a material of high thermal conductivity. An optical member 10 formed integrally by using an optical material of high light transmissivity is composed of a substrate fixing part 16 for fixing the silicon substrate 6, and a fixing part 17 forming a condenser unit 11.

In the fixing part 17 of the optical member 10, the condenser unit 11 is formed so as to confront an optical disk 50, and in this embodiment a diffraction grating lens is formed in the condenser unit 11. The diffraction grating lens formed in the condenser unit 11 is nearly axis symmetrical, and is patterned so that the pitch may be smaller in the outer circumference, and this sectional shape is rectangular. A first reflector 13c and optical path transformers 13a, 13b formed near the condenser unit 11 are coated with reflection films. In the optical path transformers 13a, 13b, two kinds diffraction grating are formed at adjacent positions. In the substrate fixing part 16, an incident part 14 formed with a slope to the condenser unit 11 forming surface has a diffraction grating 15 for generating three beams. A second reflector 12 formed at a position confronting the condenser unit 11 is formed in a spherical surface, and this spherical surface is coated with a reflection film. In this embodiment, the first reflector 13c and condenser unit 11 are provided together. Accordingly, for example, when forming the first reflector 13c and condenser unit 11 by hologram or diffraction grating, the both optical members can be formed by one process, and the productivity is excellent, which is very useful.

The operation of this optical integration element is described. The optical path from exit of light from the light emitting element 1 till condensation on the recording surface of the disk 50, that is, the forward path is explained in FIG. 2. The light emitted from the light emitting element 1 propagates along an optical path 20, and is reflected by a reflection slope 5a formed in the riser mirror 5. The reflection slope 5a is formed at an angle larger than 45 degrees to the mounting plane. The reflected light propagates through an optical path 21, and is guided into the incident part 14 of the optical member 10. The incident part 14 comprises the diffraction grating 15 for generating three beams, and when it passes through the diffraction grating 15 for generating three beams, it is diffracted, and order 0 light, order +1 light, and order −1 light are generated, which propagate along an optical path 22. The light reaching the first reflector 13c is reflected, and propagates along an optical path 23 and is guided into the second reflector 12. The second reflector 12 has a spherical shape. The light guided into the second reflector 12 is transformed into nearly parallel light by the second reflector 12, and propagates along an optical path 24 to be guided into the condenser unit 11. By the diffraction grating lens formed in the condenser unit 11, it is condensed on the recording surface of the optical disk 50 along an optical path 25. Sine the light guided into the condenser unit 11 is separated into order 0 light, order +1 light, and order −1 light by the diffraction grating 15 for generating three beams, when condensed in the condenser unit 11, three light spots are formed on the recording surface of the optical disk 50. This mode is shown in FIG. 3.

Figure 3:
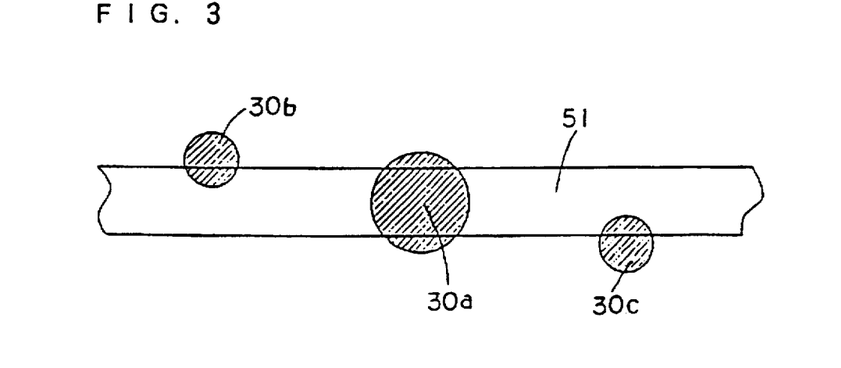
FIG. 3 is a diagram showing the mode of spot condensed on the optical disk surface by the optical integration element shown in FIG. 1.

As shown in FIG. 3, on a data track 51 formed in the optical disk 50, a main beam spot 30a (order 0 light), and sub beam spots 30b, 30c (order +1 light, order −1 light) are formed. Tracking control is effected by controlling so that the data track 51 may be enclosed by the sub beam spots 30b, 30c.

Incidentally, since the output of the semiconductor laser used as the light emitting element 1 varies with temperature and other conditions, it is a general method to control the driving current by monitoring the emitted light. In this embodiment, the reflection slope 8 is formed in the optical member 10, and the light emitted from the rear end surface of the light emitting element 1 (semiconductor laser) is reflected by the reflection slope 8, and is guided into the monitor sensor 7 formed in the silicon substrate 6 along the optical path 20a, while the quantity of light is detected by the monitor sensor 7, thereby controlling so that the light output emitted from the light emitting element 1 may be constant.

Figure 4A:
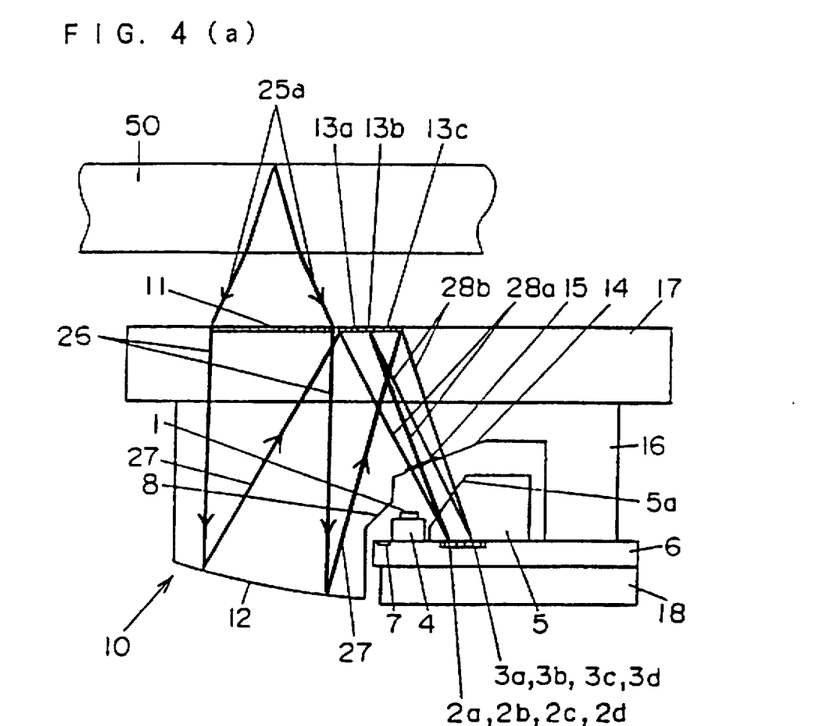
Figure 4B:
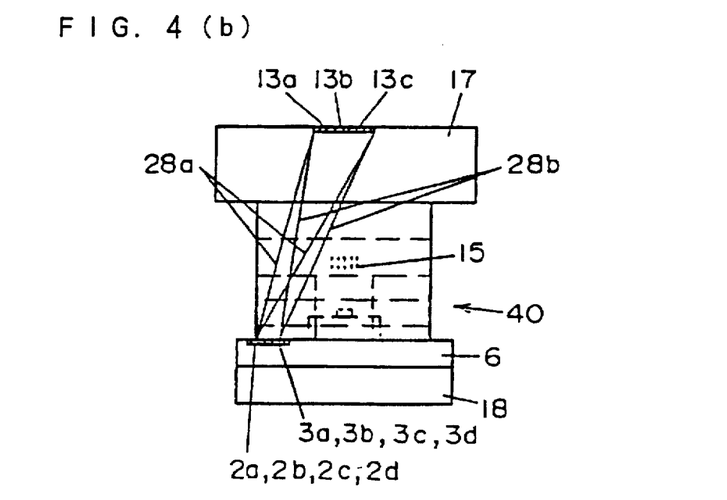

Next is explained the optical path until the reflected light from the optical disk 50 is guided into the photo sensors 2a, 2b, 2c, 2d, 3a, 3b, 3c, 3d, that is, the returning path, by referring to FIG. 4 (a) and FIG. 4 (b).

The light reflected by the optical disk 50 reaches the optical path transformers 13a, 13b nearly along the same optical path as the forward path (optical path 25→optical path 26→optical path 27). In the optical path transformers 13a, 13b, two kinds of divided diffraction gratings are formed, and the light reaching the optical path transformers 13a, 13b is diffracted nearly in the width direction of the optical member 10, and is separated into two convergent lights. The convergent lights respectively run along optical path 28a and optical path 28b, and pass through the incident part 14 while avoiding the diffraction grating 15 for generating three beams. The transmitted light is emitted to two kinds of four-division photo sensors 2a, 2b, 2c, 2d, and photo sensors 3a, 3b, 3c, 3d.

Detecting methods of focus error signal, tracking error signal, and data signal in the photo sensors 2a, 2b, 2c, 2d and photo sensors 3a, 3b, 3c, 3d are explained below by reference to FIG. 5 (a), FIG. 5 (b), and FIG. 5 (c). Photo spots 31a, 32b are photo spots of the main beam returned after being reflected by the optical disk 50, and photo spots 31b, 32b, and photo spots 31c, 32c are photo spots of sub beams, respectively.

First, the detecting method of focus error signal is described. A focus error signal is detected by converting the quantity of light of the photo spot 31a photoelectrically by the photo sensors 2b and 2c. FIG. 5 (a) shows the in-focus state of the light spot in the optical disk 50, and the photo spots 31a, 31b, 31c are also in-focus on the photo sensor surface. At this time, it is adjusted so that the quantities of light detected by the photo sensor 2b and photo sensor 2c may be equal. FIG. 5 (b) shows a case of deviation of the optical disk 50 from the in-focus position toward the optical integration element, and the photo spots 31a, 31b, 31c are larger in spot size than those of in-focus state (FIG. 5(a)), and the quantity of light detected by the photo sensor 2b is larger than the quantity of light detected by the photo sensor 2c. FIG. 5 (c) shows a case of deviation of the optical disk 50 in the opposite direction of FIG. 5 (b), and the quantity of light detected by the photo sensor 2c is larger than the quantity of light detected by the photo sensor 2b, contrary to FIG. 5 (b). Therefore, the focus error signal can be detected by determining the difference signal of the quantity of light by the photo sensor 2b and the quantity of light by the photo sensor 2c.

Figure 5:
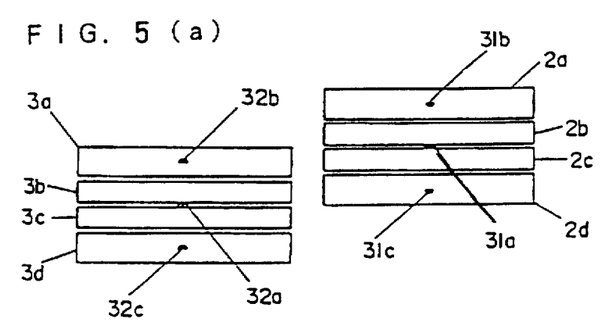

Next is explained the detecting method of tracking error signal by reference to FIG. 3 and FIG. 5 (a). The tracking error signal is detected by a general method of three-beam detecting method. FIG. 3 shows the on-track state of the main beam spot 30a on the data track 51, and the sub beam spots 30b and 30c overlap the data track 51 nearly by a same area. The sub beam spot 30b corresponds to the photo spots 31b and 32b, and the sub beam spot 30c corresponds to the photo spots 31c and 32c.

When the main beam spot 31a is deviated from the data track 51 to the direction of the sub beam spot 30b, the overlapping area of the sub beam spot 30dc and data track 51 becomes larger than the overlapping area of the sub beam spot 30b. Therefore, the sum of the quantities of light of the photo spot 31c and photo spot 32c is larger than the sum of the quantities of light of the photo spot 31b and photo spot 32b. To the contrary, when the main beam spot 30a is deviated in the opposite direction, the overlapping area of the sub beam spot 30b and data track 51 becomes larger than the overlapping area of the sub beam spot 30c, and hence the sum of the quantities of light of the photo spot 31b and photo spot 32b is larger than the sum of the quantities of light of the photo spot 31c and photo spot 32c. Therefore, by determining the difference signal of the sum of the quantity of received light of the photo sensor 2a and quantity of received light of the photo sensor 3a, and the sum of the quantity of received light of the photo sensor 2d and quantity of received light of the photo sensor 3d, the tracking error signal can be detected.

The data signal may be detected by receiving the reflected light of the main beam spot 30a, and hence it can be detected by calculating the sum signal of the quantity of received light of the photo sensor 2b, quantity of received light of the photo sensor 2c, quantity of received light of the photo sensor 3b, and quantity of received light of the photo sensor 3c.

In the optical integration element shown in FIG. 1, the second reflector 12 has a spherical surface, but a surface shape forming part of spheroid may be formed in the second reflector 12 instead. At this time, by selecting the shape so that the optical path 22 reflected by the second reflector 12 may be convergent light (nearly spherical wave), the grating pitch of the diffraction grating lens forming the condenser unit 11 may be widened, so that it may be more resistant to wavelength fluctuations.

Figure 6:
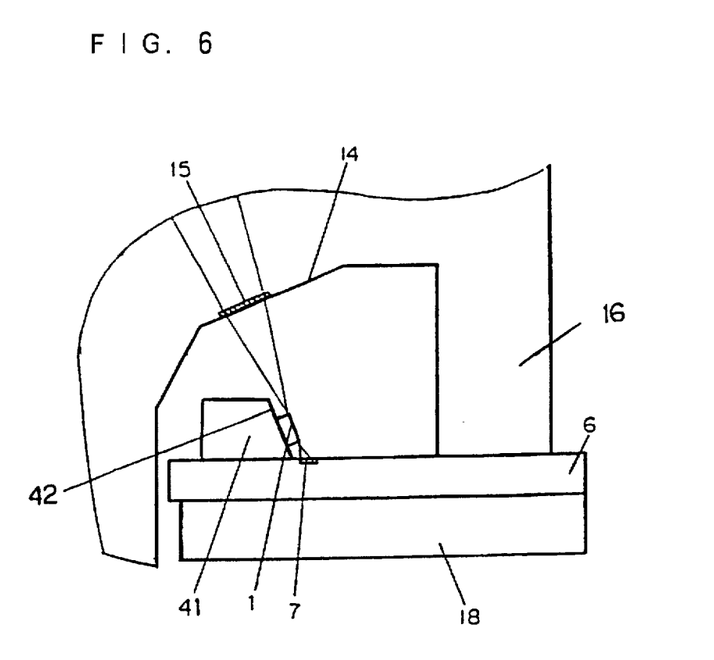
FIG. 6 is a side view of the vicinity of a light emitting element of an optical integration element in other embodiment of the invention as seen from the side.

Other optical integration element of the invention is described below by referring to FIG. 6. The mounting method of light emitting element 1 and detecting method of output of the light emitting element 1 are different from the case of the optical integration element shown in FIG. 1. The light emitting element 1 shown in FIG. 6 is also a semiconductor laser same as in the case of the foregoing optical integration element. A mount member 41 forming a mounting slope 42 for the light emitting element 1 is composed of a material of high conductivity, and functions also as electrode The light emitted from the rear end of the light emitting element 1 is directly emitted to the monitor sensor 7. By thus constituting, the riser mirror 5 used in the first embodiment shown in FIG. 1 can be omitted.

Figure 7:
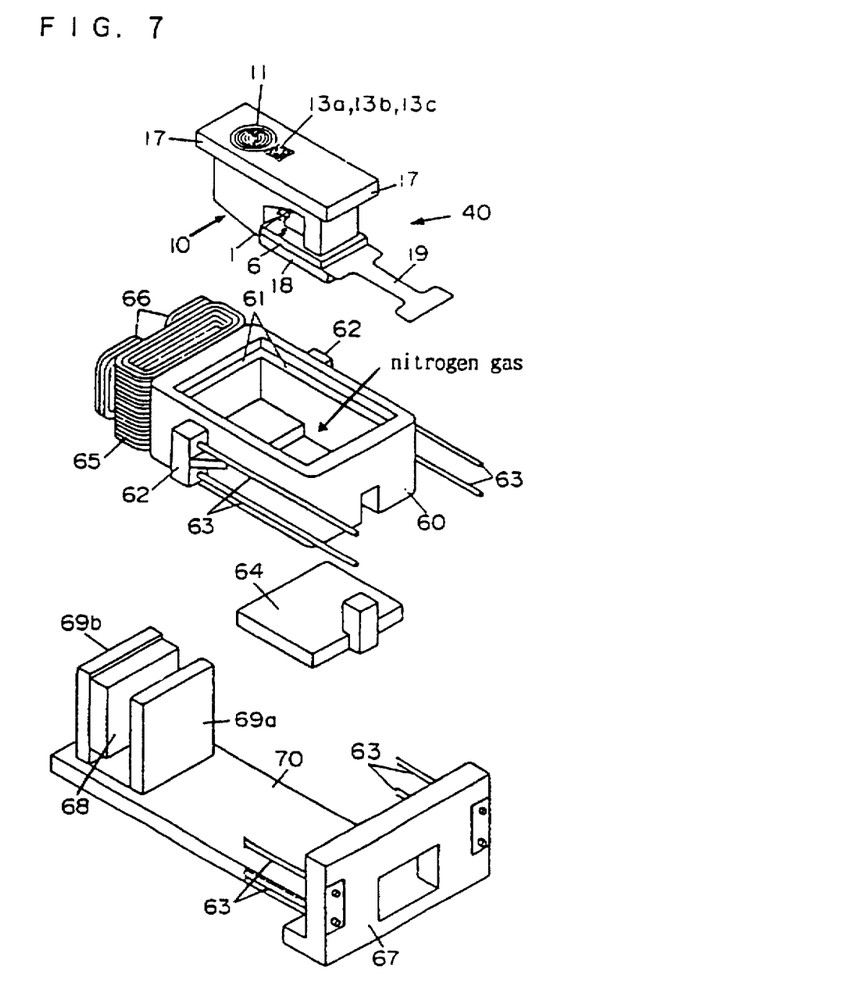
FIG. 7 is a perspective view showing members for composing an integration type optical pickup device using the optical integration element shown in FIG. 1.
Figure 8:
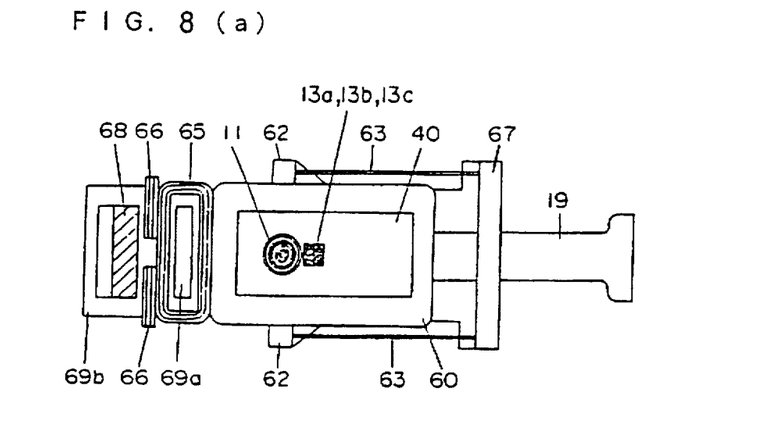

An example of integration type optical pickup device of the invention is described below by reference to FIG. 7, FIG. 8 (a), and FIG. 8 (b). In FIG. 7, FIG. 8 (a), and FIG. 8 (b), an optical integration element 40 is same in constitution as the optical integration element shown in FIG. 1, and its explanation is omitted. However, in a heat sink 18, a flexible printed circuit (FPC) 19 is fixed for exchanging driving current and detection signal between the light emitting element 1 and the photo sensors 2a, 2b, 2c, 2d, and photo sensors 3a, 3b, 3c, 3d. A bobbin 60 formed integrally of resin or the like comprises a element fixing part 61 and a support part 62. A focusing coil 65 and a tracking coil 66 are fixed in the bobbin 60. Two wires 63 for supporting the bobbin 60 movably in the focus direction and tracking direction are fixed each on the support part 62 formed on the side surface of the bobbin 60. One end of each wire 63 is fixed to a side plate 67 formed integrally with a base part 70. A permanent magnet 68 and yoke members 69a, 69b responsible for focus control and tracking control are fixed on the base part 70. The yoke members 69a, 69b are constituted so as to be positioned in the core of the focusing coil 65, and the permanent magnet 68 is fixed to the yoke member 69b so as to be opposite to the fixed side of the tracking coil 66. A fixing part 17 of an optical member 10 is fitted to the element fixing part 61 of the bobbin 60. Nitrogen gas is sealed inside the bobbin 60, which is enclosed with a bottom plate 64.

In this constitution, at least the light emitting element 1 is not exposed to the atmosphere, which reduces the risk of shortening of the life or breakdown of the element due to steam or corrosive gas contained in the atmosphere. It is also possible to form the bottom plate 64 of a material of high heat conductivity to function to promote release of heat.

Figure 9:
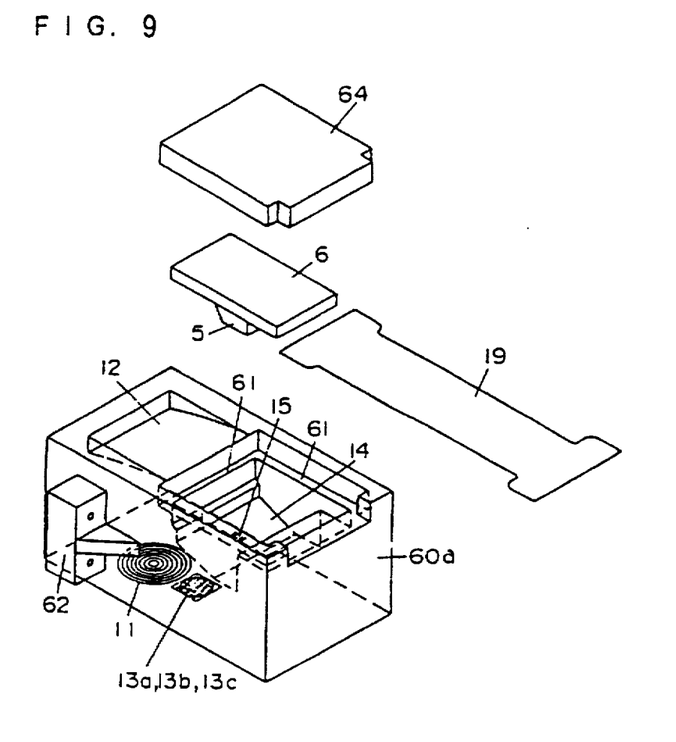
FIG. 9 is a perspective view showing members for composing part of a different integration type optical pickup device of the invention.

A different integration type optical pickup device of the invention is described by referring to FIG. 9. FIG. 9 is a perspective view seen from the top of the fixed side of a silicon substrate 6. What differs from the optical pickup device shown in FIG. 7 is that the bobbin 60a is integrated with the same member as the optical member 10. In FIG. 9, same reference numerals as in FIG. 1 denote same members, and other members and structures not shown in FIG. 9 are nearly same as shown in FIG. 7. On the silicon substrate 6, photo sensors 2a, 2b, 2c, 2d, photo sensors 3a, 3b, 3c, 3d, and a monitor sensor 7 are formed, and the light emitting element 1 (not shown) and riser mirror 5 are fixed. This silicon substrate 6 is fixed to the substrate fixing part 16 formed in the optical member 10 of the bobbin 60a, and inert gas such as nitrogen gas and argon gas is sealed inside of the bobbin 60a, which is enclosed with a bottom plate 64 functioning as cooling plate. The constitution of focus and tracking driving means is same as in FIG. 7, FIG. 8 (a), and FIG. 8 (b). In this constitution, the number of parts can be decreased, and the size and weight can be reduced easily.

Figure 10:
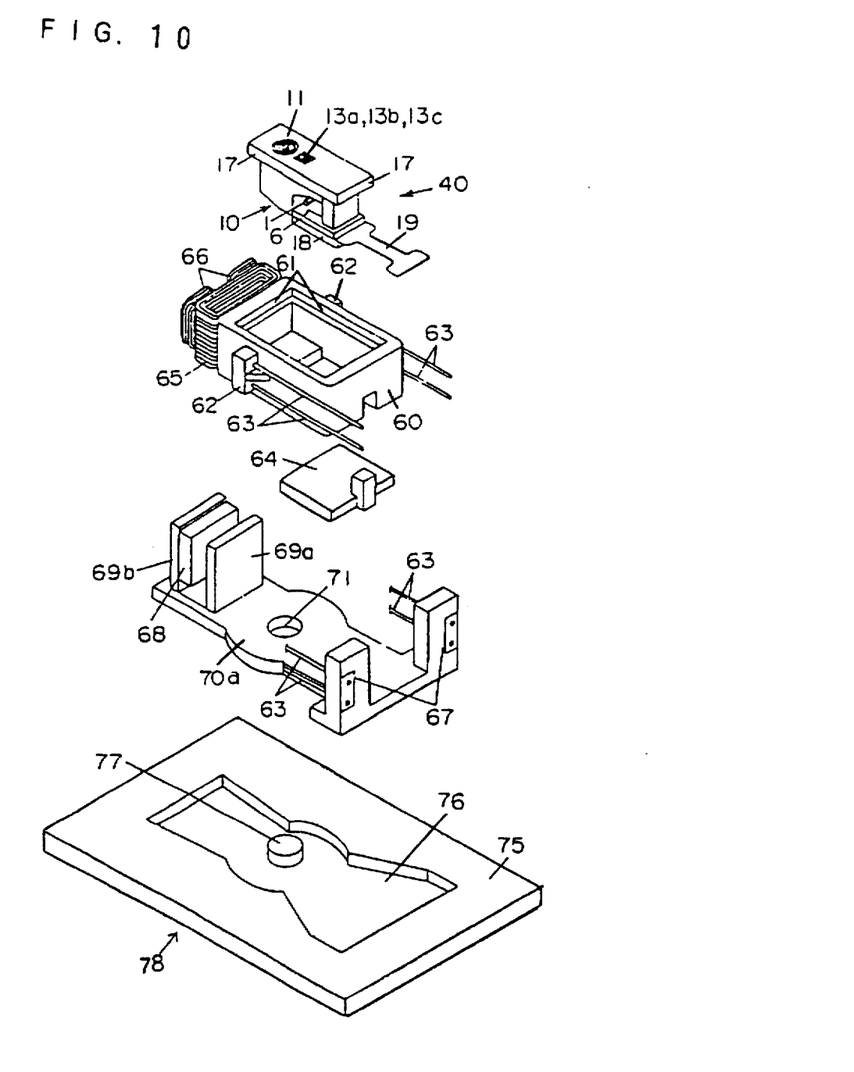
FIG. 10 is a perspective view showing members for composing other different integration type optical pickup device of the invention.

Another integration type optical pickup device of the invention is described while referring to FIG. 10. This optical pickup device is composed by adding a base plate 78 to the optical pickup device shown in FIG. 7. The shape of a base 70a is, however, different from that of the base 70 shown in FIG. 7. The base plate 78 has a step 76 and a protrusion 77, and the protrusion 77 is inserted into a penetration hole 71 provided in the base 70a. The penetration hole 71 is formed preliminarily at a position so that its center may pass through the main beam spot and come to the axis vertical to the optical disk surface. Therefore, by inserting the protrusion 77 into the penetration hole 71, the base 70a incorporating the optical integration element 40 rotates about the center of the penetration hole 71, so that the position may be finely adjusted. After adjusting the main beam spot 30a, and sub beam spots 30b, 30c so as to be located at specific positions on the data track, the base 70a is fixed to the fixing part 75 of the base plate 78 with resin or the like. In such constitution, the position of three beams can be adjusted easily, and the assembling performance is enhanced.

To the base plate 78, instead of the integration type optical pickup device shown in FIG. 7, the optical pickup device shown in FIG. 9 may be fixed. In these integration type optical pickup devices, as a matter of course, the optical integration element shown in FIG. 6 may be also used, instead of the optical integration element 40 shown in FIG. 1.

Figure 11:
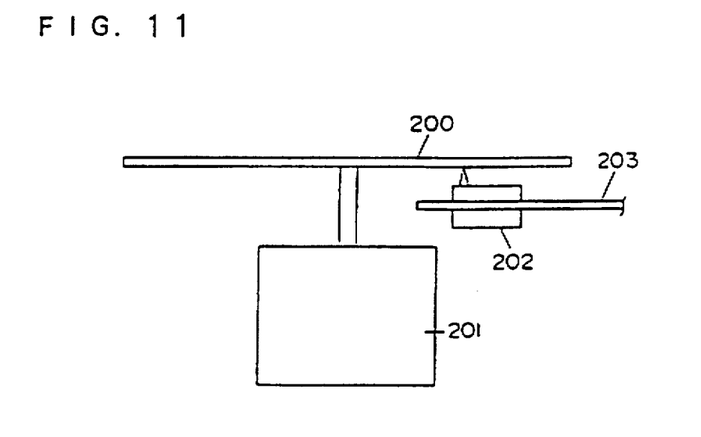
FIG. 11 is a diagram showing an optical pickup device using an integration type optical pickup device of the invention.

FIG. 11 is a diagram showing an optical disk device incorporating the integration type optical pickup device of the invention. This optical disk device comprises a light medium 200, a spindle motor 201 for rotating the light medium 200, and an integration type optical pickup device 202. As the device 202, for example, the structure shown in FIG. 10 is used. A guide member 203 is to guide the integration type optical pickup device 202. In this way, in the optical disk device of the embodiment, the size can be reduced by using the integration type optical pickup device of the invention, so that it can be mounted in a small-sized personal computer.

According to the optical integration element of the invention, the exit light from the light emitting element enters from the incident plane, and is reflected by the first reflector to propagate to the second reflector, and is transformed into nearly parallel light or converging light by the second reflector, and propagates to the condenser unit to be condensed on the optical recording medium. The reflected light from the optical recording medium is deflected in the optical path transformer, and is guided into the photo sensor. Thus, in the optical integration element of the invention, almost all components necessary for the optical system of the optical pickup device such as light emitting element, photo sensors, deflection mirror and objective lens can be integrated, so that small and thin optical integration elements excellent in mass producibility may be realized. Besides, the second reflector functions as collimator lens, the condenser unit has the optical axes of incident light and exit light existing nearly coaxially, and a concentric diffraction grating is composed, so that it may be resistant to wavelength fluctuations and enhanced in reliability.

Moreover, according to the integration type optical pickup device of the invention comprising focus control means and tracking control means, the optical integration element of the invention is used to compose the means for reading information recorded in the optical recording medium, and also the bobbin for firmly fixing the focusing coil and tracking coil is provided to insert and fix the optical integration element in the bobbin, and the inside of the bobbin is sealed with inert gas such as nitrogen gas and argon gas, so that at least the light emitting means may be enclosed. Still more, the optical members and bobbin for composing the optical element are formed by integration, and therefore at least the light emitting element is not exposed to the atmosphere, and the life of the light emitting element is extended, the risk of breakdown of element is eliminated, and hence the reliability is enhanced. Yet, by integrating the optical members and bobbin for composing the optical integration element, the number of parts is decreased, and the assembling performance is improved.

Further according to the optical disk device of the invention, by composing by using the integration type optical pickup device of the invention, the integration type optical pickup is fixed, and the pickup means capable of moving in a direction crossing the data track is provided, and adjustment means for adjusting three beams at specified positions on the data track is provided, and therefore the adjustment of three beams is facilitated, and the assembling performance is improved.

The invention is not limited to the foregoing embodiments alone, but various changes and modifications are possible. For example, in the illustrated embodiments, a permanent magnet and coils are disposed on a base and a bobbin, respectively, but conversely, a permanent magnet and coils are disposed on a bobbin and a base, respectively. Therefore, all modifications existing within the true spirit and scope of the invention shall be included in the scope of the claims.

What is claimed is:

1. An integration type optical pickup device comprising:

an optical integration element; and an accommodating member accommodating and sealing said optical integration element, wherein said optical integration element comprises, a light emitting element for emitting light;

receiving means for receiving reflected light;

a heat sink, wherein said light emitting element is disposed above said heat sink; and an optical member for propagating emitted light from said light emitting element and releasing the emitted light after reflecting the emitted light a plurality of times said optical member including a plurality of optical elements, wherein said light emitting element is spaced from said optical member, and wherein inert gas is sealed inside said accommodating member.

2. The integration type optical pickup device according to claim 1, wherein the space between said light emitting element and said optical member is filled with said inert gas.

3. The integration type optical pickup device according to claim 1, further comprising, a plane, wherein said light emitting element is fixed on said plane through said heat sink, and wherein said optical member is fixed on said plane having an opening between said light emitting element and said optical member.

4. The integration type optical pickup device according to claim 3, wherein said plane is formed of a silicon substrate.

5. The integration type optical pickup device according to claim 3, wherein said plane is formed of a material having high thermal conductivity.

6. An integration type optical pickup device comprising:

an optical integration element; and an accommodating member accommodating and sealing said optical integration element, wherein said optical integration element comprises, a light emitting element for emitting light;

receiving means for receiving reflected light;

a first heat sink, wherein said light emitting element is disposed above said first heat sink;

a second heat sink, wherein said first heat sink is disposed above said second heat sink; and an optical member for propagating emitted light from said light emitting element and releasing the emitted light after reflecting the emitted light a plurality of times, said optical member including a plurality of optical elements, wherein said light emitting element is spaced from said optical member, wherein inert gas is sealed inside said accommodating member, and wherein said first heat sink is smaller than said second heat sink.

7. The integration type optical pickup device according to claim 6, wherein at least one of said first and said second heat sink is formed of a silicon substrate.

8. The integration type optical pickup device according to claim 7, wherein said receiving means has high thermal conductivity.

* * * * *